R. RISNER.
LEVELING ATTACHMENT FOR THRESHERS AND OTHER VEHICLES.
APPLICATION FILED NOV. 16, 1909.
980,439.
Patented Jan. 3, 1911.
2 SHEETS—SHEET 1.
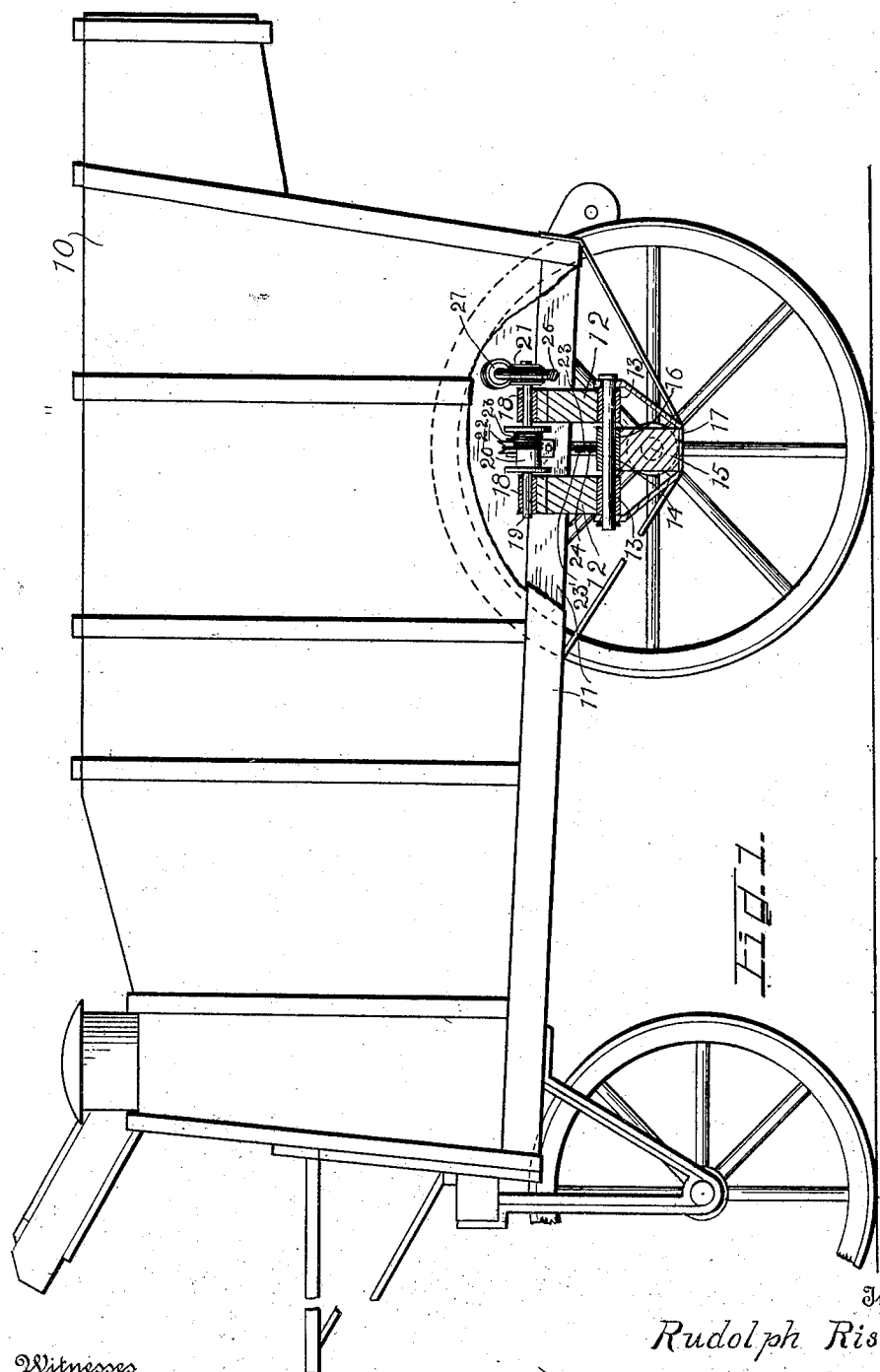
Fig. 1.
Witnesses
S. P. Buck
L. N. Gillis
Inventor,
Rudolph Risner.
By 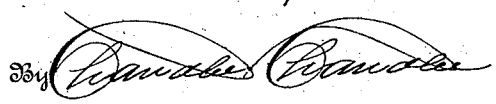
Attorneys.

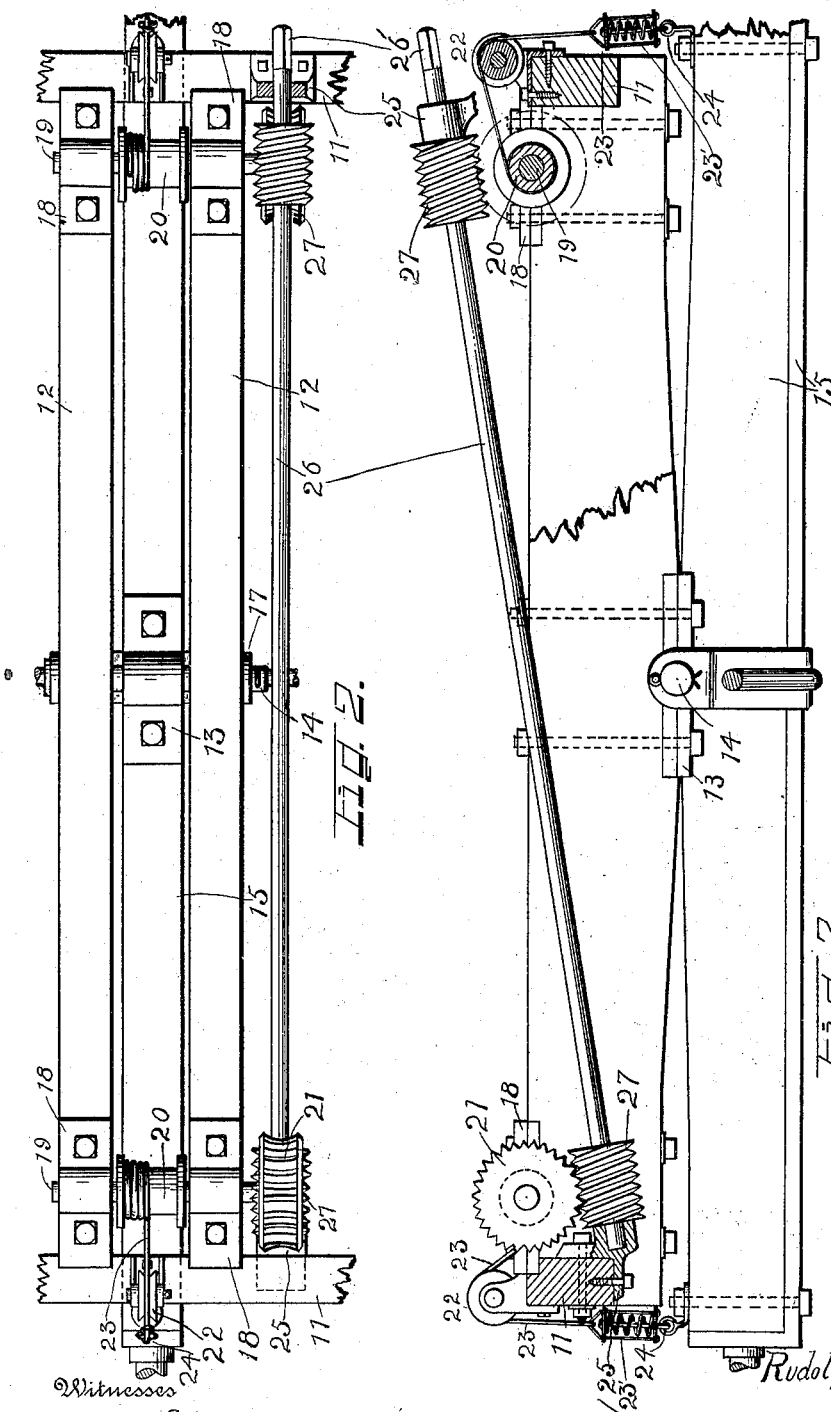

UNITED STATES PATENT OFFICE.

RUDOLPH RISNER, OF DUNSMORE, SOUTH DAKOTA.

LEVELING ATTACHMENT FOR THRESHERS AND OTHER VEHICLES.

980,439.

Specification of Letters Patent. Patented Jan. 3, 1911.

Application filed November 16, 1909. Serial No. 528,417.

*To all whom it may concern:*

Be it known that I, RUDOLPH RISNER, a citizen of the United States, residing at Dunsmore, in the county of Hyde, State of South Dakota, have invented certain new and useful Improvements in Leveling Attachments for Threshers and other Vehicles; and I do hereby declare the following to be a full, clear, and exact description of the invention, such as will enable others skilled in the art to which it appertains to make and use the same.

This invention relates to vehicles and has special reference to devices for leveling vehicles.

It is a well understood fact that all classes of threshing machines, wheel supported baling presses and the like machines are drawn from place to place and are oftentimes set up upon irregular ground. The front wheels of all of such vehicles have a certain movement relative to the body of the machine so that the unevenness of the ground does not affect the machine so long as the hind wheels are level. The hind wheels as usually constructed are on a fixed axle and if the ground be uneven the entire machine is thus thrown to one side or the other.

The principal object of the present invention is to provide an improved means for adjusting the body of the vehicle relative to the hind axle or wheels so that the machinery may at all times remain perfectly level without reference to the irregularity or inclination of the ground. This object is usually obtained by digging out the ground beneath one or the other of the wheels as the case may be but in the present instance there is provided an invention which consists, in general, of novel and improved means to vary the position of the rear bolsters with reference to the rear axle.

The invention further consists in certain novel details of construction and combinations of parts hereinafter fully described, illustrated in the accompanying drawings, and specifically set forth in the claim.

In the accompanying drawings, like characters of reference indicate like parts in the several views, and:—Figure 1 is a section through the device showing the application of the same to a thresher. Fig. 2 is an enlarged top plan view of the device removed from the thresher. Fig. 3 is an enlarged view of the device taken from one end of the thresher showing the same removed therefrom.

The numeral 10 indicates the body of a thresher or the like piece of farm machinery and at 11 are indicated the side sills. In the application of this invention the usual rear bolster is removed and this rear bolster is replaced by a pair of spaced bolsters 12 whereon the side sills 11 are supported. Bearings 13 are secured centrally of the under side of the bolsters and these bearings serve to hold the pivot bolt 14.

At 15 is indicated the rear axle and this rear axle is provided centrally of its upper side with a bearing 16 which serves to receive the pivot bolt 14 so that the bolster is pivoted to the axle in such manner that the ends of the bolsters may be adjusted to or from the respective ends of the axle.

Supported on the pivot bolt 14 is a safety strap 17 provided with perforated ends which engage the pivot bolt and this strap extends beneath the central portion of the axle so that it serves to prevent accidental displacement of the axle by the bearing thereof pulling away.

In order to provide for the adjustment of the bolster ends to or from the axle ends the upper side of each bolster is provided at each end with a bearing 18 and the bearings on one bolster are in opposition to the bearings on the other bolster so that the openings therein are in axial alinement. Supported in each pair of the bearings thus formed is a shaft 19 whereon is mounted a winding drum 20. One end of this shaft projects beyond its bearing a considerable distance and securely fixed to this end is a worm wheel 21. Mounted on the side sill at each end of the axle is a pulley 22 and ropes 23 or other suitable flexible elements are wound on the winding drums and extend over the pulleys. The free ends of these ropes are attached to suitable springs 23′ which are in turn attached to eye bolts 24 secured at each end of the axle. It is to be observed that the ropes are wound on their respective drums in the same directions and in the present instance each rope is shown as leading off the top of its respective drum. Now, in order to keep the proper tension between the two ropes one of the drums must be unwound as the other is wound up and in order to accomplish this the worm wheels 21 are both made either right hand or left hand so that they both may be described as being of the same "hand". In order to actuate these drums brackets 25 are mounted on one of the bolsters and in these brackets 25 is carried a shaft 26 so arranged that it passes over one of the worm wheels and under the other worm wheel. This shaft 26 is further provided with a square or other suitable end 26' for the attachment of a crank not deemed necessary here to be shown. Fixed on the axle 26 are worms 27, each of the same "hand" and one of these worms engages with one of the worm wheels 21 beneath the same while the other worm engages with the other worm wheel above the same.

In the operation of this device when it is desired to adjust the rear end of the machinery it is merely necessary to apply the crank to the axle 26 and rotate the same in the desired direction. This will cause one of the drums 20 to wind up and the other drum to unwind and the positions of the ends of the bolsters will be changed relative to the positions of the ends of the axle. In other words, each of the bolsters will have one end drawn toward the axle and the other end allowed to move away therefrom.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claim.

Having thus described the invention, what is claimed as new, is:—

In a device of the kind described, a pair of spaced bolsters, a pivot bolt extending across said bolsters, an axle carried on said pivot bolt, and means carried on the bolsters to adjust the positions of the ends of said bolsters relative to the ends of the axle, said means including winding drums supported on said bolsters at the ends of the bolsters, a flexible connection between each of said drums and the axle, the connection at one end being wound on a drum in the same direction as the connection at the other end, a worm wheel in fixed relation to each drum, both worm wheels being of the same "hand", a shaft rotatably mounted on one of the bolsters and provided with a crank receiving end, said shaft extending over one drum and under the other, and worms on said shaft meshing with said worm wheels.

In testimony whereof, I affix my signature, in presence of two witnesses.

RUDOLPH RISNER.

Witnesses:
A. C. RUDINE,
EMMA RISNER.